June 10, 1930. A. CRAIGON 1,762,613
INTERNAL COMBUSTION ENGINE
Filed Aug. 9, 1928
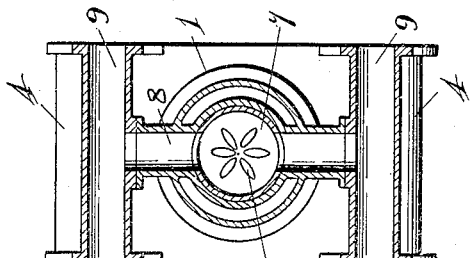
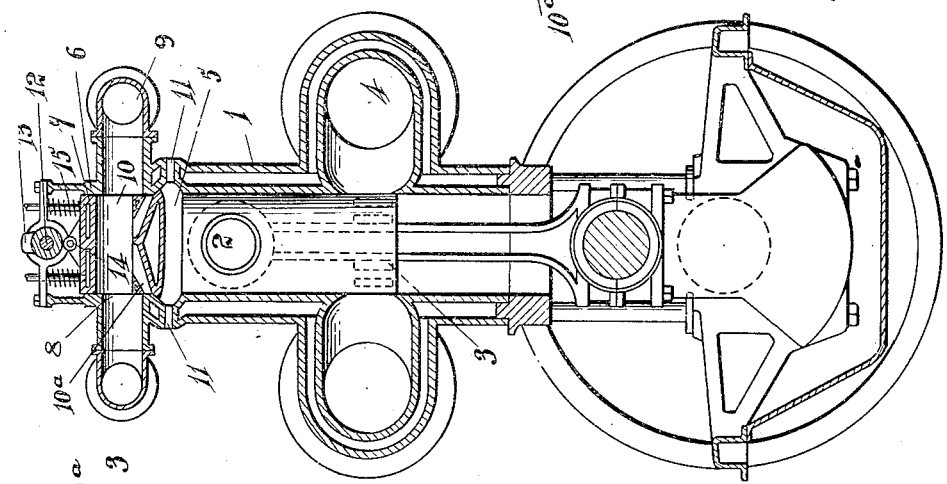
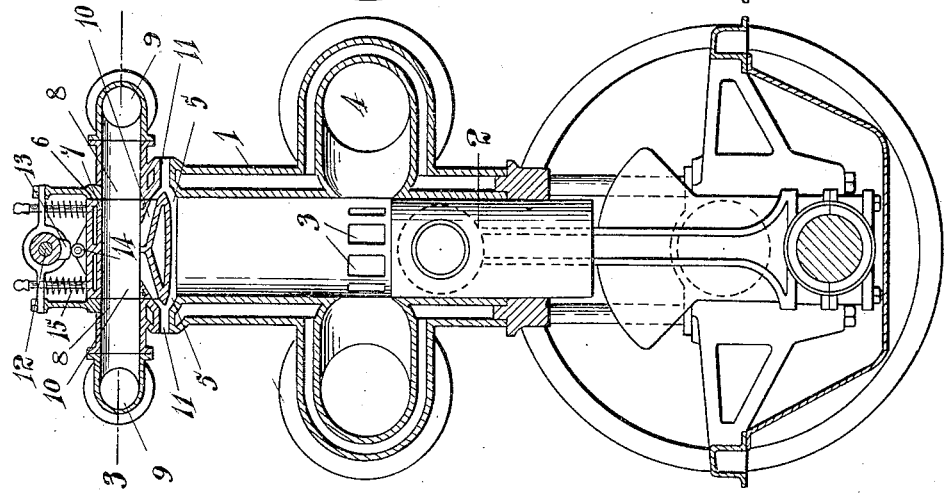
Inventor
by Adam Craigon
J. Edw. Maybee
ATTY.

Patented June 10, 1930

1,762,613

UNITED STATES PATENT OFFICE

ADAM CRAIGON, OF TORONTO, ONTARIO, CANADA, ASSIGNOR TO CRAIGON ENGINES LIMITED, OF HAMILTON, CANADA

INTERNAL-COMBUSTION ENGINE

Application filed August 9, 1928. Serial No. 298,523.

This invention relates to internal combustion engines in which the flow of the working fluid is controlled, in part at least, directly by the piston, and my object is to devise a construction which provides for an uniflow movement of the working fluid and which is particularly adapted for operation on a two-stroke Diesel cycle.

I attain my object by means of a construction which may be briefly described as follows. A combustion chamber is provided communicating with one end of the cylinder of the engine. A piston valve forms one wall of the cylinder and is movable in a cylindrical guide having a port in its wall, the valve being adapted to control the communication between said port and the combustion chamber. A port, controllable by the engine piston, is formed in the main cylinder wall remote from the combustion chamber.

The invention is hereinafter more fully described and is illustrated in the accompanying drawings in which Fig. 1 is a vertical section of an engine constructed in accordance with my invention, parts not concerned with the invention being omitted;

Fig. 2 a similar view showing the parts in a different position; and

Fig. 3 a cross section on the line 3—3 in Fig. 1.

In the drawings like numerals of reference indicate corresponding parts in the different figures.

1 is the cylinder of an internal combustion engine, and 2 the piston.

The other parts, being such as are commonly known in the art, require no special mention.

3 are ports formed in the cylinder adapted to be uncovered by the piston at the lower end of its stroke. These ports communicate with the manifold 4.

At the outer end of the cylinder is formed the combustion chamber 5. This is preferably of larger diameter than the engine cylinder and its walls flare inwardly, as shown, for a purpose which will hereinafter appear.

In axial alinement with the engine cylinder is formed a cylindrical guide 6 in which is fitted a piston valve 7, the lower end of which forms the wall of the combustion chamber opposite the end of the engine piston. In the sides of the cylinder guide 6 are formed ports 8 which communicate with the manifold 9.

Through the piston valve is formed a passage 10 which, at opposite ends, extends through its sides. A plurality of radially disposed passages 10ª are also formed in the piston valve. When the valve is in the position shown in Fig. 1, these passages 10ª are in communication with the combustion chamber 5 adjacent the upper side of its flaring side wall. Any gaseous fluid passing through these passages from the manifold 9 is thus directed round the edges of the inner end of the piston valve to pass into the cylinder.

When the piston valve is in the position shown in Fig. 2, communication between the ports 8 and the combustion chamber 5 is cut off and the combustion chamber communicates only with the interior of the engine cylinder.

One or more openings 11 are formed in the walls of the combustion chamber. If the engine is to operate with an explosive mixture, these openings serve for the positioning of spark plugs. If the engine is to operate as a Diesel engine, fuel injection valves will be applied to these openings.

While either manifold may be used as the inlet manifold, it is preferable to admit the air or gaseous mixture through the manifold 9 and to exhaust through the manifold 4.

To operate the piston valve I show the cam shaft 12, which will be operated in any known manner and is provided with the cam 13 engaging the anti-friction roller 14 on the valve. Springs 15 are suitably mounted to maintain the roller in contact with the cam.

The operation of the device is as follows: Assuming the parts to be in the position shown in Fig. 1, with the piston valve open, and assuming also that the device is to be operated as a two stroke cycle Diesel, scavenging air is forced through the manifold 9, passing through and around the piston valve through the combustion chamber and cylinder to the manifold 9. The valve then closes and the piston moves up compressing the air in the combustion chamber. As soon as full compression is reached, fuel is injected into the combustion chamber and becomes ignited as usual by the heat due to compression. The piston is then forced outwardly until at the end of the firing stroke the ports 3 are uncovered and exhaust takes place.

The valve timing is preferably such that the exhaust valve closes a little ahead of the scavenging or inlet valve whereby a supercharging effect is obtained.

What I claim as my invention is:

In an internal combustion engine, the combination of a cylinder; a piston movable in the cylinder; a combustion chamber communicating with one end of the cylinder but of greater diameter; a piston valve forming one wall of the combustion chamber; a cylinder in alinement with the aforesaid cylinder forming a guide for said piston valve and having a port in its wall; a port in the main cylinder wall remote from the combustion chamber and controlable by the piston; and a port through the piston valve, whereby, when the valve is reciprocated, the port in the piston valve guide cylinder may be brought into and out of communication with the combustion chamber.

Signed at Toronto this 29th day of June, 1928.

ADAM CRAIGON.